United States Patent
Lin et al.

(10) Patent No.: US 12,127,205 B2
(45) Date of Patent: Oct. 22, 2024

(54) METHODS FOR UPLINK CONTROL INFORMATION MULTIPLEXING TRANSMISSION AND RELATED PRODUCTS

(71) Applicant: GUANGDONG OPPO MOBILE TELECOMMUNICATIONS CORP., LTD., Guangdong (CN)

(72) Inventors: Yanan Lin, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 378 days.

(21) Appl. No.: 17/562,613

(22) Filed: Dec. 27, 2021

(65) Prior Publication Data

US 2022/0124703 A1 Apr. 21, 2022

Related U.S. Application Data

(63) Continuation of application No. PCT/CN2019/095499, filed on Jul. 10, 2019.

(51) Int. Cl.
*H04W 72/21* (2023.01)
*H04L 1/00* (2006.01)

(52) U.S. Cl.
CPC .......... *H04W 72/21* (2023.01); *H04L 1/0061* (2013.01)

(58) Field of Classification Search
CPC .... H04W 72/21; H04L 1/0061; H04L 1/0067; H04L 1/0073
See application file for complete search history.

(56) References Cited

U.S. PATENT DOCUMENTS

2019/0053097 A1  2/2019  Rico Alvarino et al.

FOREIGN PATENT DOCUMENTS

| CN | 103095398 | 5/2013 | |
|---|---|---|---|
| CN | 106067845 | 11/2016 | |
| CN | 109474997 | 3/2019 | |
| CN | 109802813 | 5/2019 | |
| CN | 109802819 | 5/2019 | |
| EP | 3734922 | 11/2020 | |
| EP | 3734922 A1 * | 11/2020 | .......... H04L 1/0068 |
| WO | 2018231626 | 12/2018 | |
| WO | 2019104711 | 6/2019 | |
| WO | 2019130521 | 7/2019 | |

OTHER PUBLICATIONS

OPPO, 3GPP TSG RAN WG1, #97, R1-1907777, "Summary #2 on UCI Enhancements for URLLC", May 2019.

(Continued)

*Primary Examiner* — Mohammad S Anwar
(74) *Attorney, Agent, or Firm* — Hodgson Russ LLP (57) ABSTRACT

A method for uplink control information (UCI) multiplexing transmission and related products are provided in implementations of the present disclosure. The method includes transmitting multiple UCI on at least one target physical resource block, where a maximum coding rate corresponding to each of the multiple UCI is separately configured, and the at least one target physical resource block is determined from preset physical resource blocks according to multiple maximum coding rates corresponding to the multiple UCI.

14 Claims, 4 Drawing Sheets

(56) References Cited

OTHER PUBLICATIONS

WIPO, International Search Report for International Application No. PCT/CN2019/095499, Mar. 26, 2020.
Huawei et al., "UCI enhancements for URLLC," 3GPP TSG RAN WG1 Meeting #96b, R1-1903955, Apr. 2019.
EPO, Extended European Search Report for EP Application No. 19936681.6, May 23, 2022.
CNIPA, Second Office Action for CN Application No. 201980092333.2, May 25, 2023.
CNIPA, First Office Action for CN Application No. 201980092333.2, Mar. 6, 2023.

* cited by examiner

METHODS FOR UPLINK CONTROL INFORMATION MULTIPLEXING TRANSMISSION AND RELATED PRODUCTS

CROSS-REFERENCE TO RELATED APPLICATION(S)

This application is a continuation of International Application No. PCT/CN2019/095499, filed on Jul. 10, 2019, the entire disclosure of which is incorporated herein by reference.

TECHNICAL FIELD

This disclosure relates to the technical field of communications, and in particular to methods for uplink control information (UCI) multiplexing transmission and related products.

BACKGROUND

5th generation mobile network (or 5th generation wireless system, 5G) introduces ultra-reliable low latency communications (URLLC) services. As for the URLLC service, transmission of ultra-high reliability (e.g., 99.999%) can be realized within extremely short latency (e.g., 1 millisecond (ms)). Since a performance requirement of the URLLC service is greatly different from that of an enhanced mobile broadband (eMBB) service, multiplexing transmission of information corresponding to the two services may result in decreased system efficiency or reliability. At present, as for the URLLC service in standard release 16 (Rel-16), according to a discussion in 3rd generation partnership project (3GPP), a user equipment (UE) can generate at least two hybrid automatic repeat request-acknowledgement (HARQ-ACK) codebooks, and different codebooks include ACK/negative acknowledgement (NACK) information corresponding to different services. In case that two HARQ-ACK codebooks collide mutually on a same time resource, if one of the two HARQ-ACK codebooks such as an HARQ-ACK codebook corresponding to the eMBB service is directly discarded, it is possible to lead unnecessary retransmission of the eMBB service, thereby decreasing system efficiency. Therefore, how to perform efficient and reliable multiplexing transmission of two HARQ-ACK codebooks is a problem to be solved.

SUMMARY

In implementations of the disclosure, methods for uplink control information (UCI) multiplexing transmission and related products are provided.

According to a first aspect, a method for UCI multiplexing transmission is provided in implementations of the disclosure. The method includes transmitting multiple UCI on at least one target physical resource block, where a maximum coding rate corresponding to each of the multiple UCI is separately configured, and the at least one target physical resource block is determined from preset physical resource blocks according to multiple maximum coding rates corresponding to the multiple UCI.

According to a second aspect, a method for UCI multiplexing transmission is provided in implementations of the disclosure. The method includes receiving multiple UCI on at least one target physical resource block, where a maximum coding rate corresponding to each of the multiple UCI is separately configured, and the at least one target physical resource block is determined from preset physical resource blocks according to multiple maximum coding rates corresponding to the multiple UCI.

According to a third aspect, a terminal is provided in implementations of the disclosure. The terminal includes a transceiver, a processor, and a memory storing a computer program which, when executed by the processor, causes the transceiver to transmit multiple UCI on at least one target physical resource block, where a maximum coding rate corresponding to each of the multiple UCI is separately configured, and the at least one target physical resource block is determined from preset physical resource blocks according to multiple maximum coding rates corresponding to the multiple UCI.

BRIEF DESCRIPTION OF THE DRAWINGS

The following will give a brief introduction to the accompanying drawings used for describing implementations or the related art.

DETAILED DESCRIPTION

The following will describe technical solutions in implementations of the disclosure with reference to accompanying drawings.

In release 15 (Rel-15) of 5th generation mobile network (5G) new radio (NR) standard, a terminal performs joint coding on all uplink control information (UCI) and then transmits the UCI subjected to the joint coding in a time slot. At most four physical uplink control channel (PUCCH) resource sets are configured by a base station via high-layer signaling, and each set includes at most 16 PUCCH resources. The number of bits of UCI carried on each set corresponds to a different range, which is illustrated as follows.

For a first PUCCH resource group, the number of bits of UCI carried satisfies $O_{UCI} \leq 2$.

For a second PUCCH resource group, the number of bits of UCI carried satisfies $2 < O_{UCI} \leq N_2$, where $N_2$ is configured via high-layer signaling maxPayloadMinus1, and if maxPayloadMinus1 is not received, $N_2$ is equal to 1706.

For a third PUCCH resource group, the number of bits of UCI carried satisfies $N_2 < O_{UCI} \leq N_3$, where $N_3$ is configured via high-layer signaling maxPayloadMinus1, and if maxPayloadMinus1 is not received, $N_2$ is equal to 1706.

For a fourth PUCCH resource group, the number of bits of UCI carried satisfies $N_3 < O_{UCI} \leq 1706$.

The terminal determines a PUCCH resource set according to the number of bits of UCI to-be-transmitted. A PUCCH resource actually used is obtained from the set according to a PUCCH resource index indicated by the base station via downlink control information (DCI). Since an available PUCCH resource is semi-statically configured by the base station, resource configuration of the available PUCCH resource is limited in flexibility. In order to improve transmission efficiency, the base station configures a maximum coding rate. The terminal determines the number of physical resource blocks actually required by this transmission according to the number of UCI to-be-feedback and the maximum coding rate. If the number of the physical resource blocks actually required is less than or equal to that of physical resource blocks included in a PUCCH resource indicated by the DCI, UCI is transmitted on the number of the physical resource blocks actually required.

Otherwise, if UCI only includes acknowledgement/negative acknowledgement (ACK/NACK), or includes ACK/NACK and an uplink scheduling request (SR), the UCI is transmitted by the terminal on the number of the physical resource blocks included in the PUCCH resource indicated by the DCI.

If UCI includes ACK/NACK and channel state information (CSI), the terminal may select a part of the CSI, and the ACK/NACK information and the selected part of the CSI are transmitted on the number of the physical resource blocks included in the PUCCH resource indicated by the DCI.

In the NR Rel-15, after performing joint coding on all ACK/NACK information to be transmitted on a physical channel, all the ACK/NACK information subjected to the joint coding has a same performance. In case that ACK/NACK corresponding to an ultra-reliable low latency communications (URLLC) service and ACK/NACK corresponding to an enhanced mobile broadband (eMBB) service are transmitted simultaneously on a physical channel, the following problems may be caused if the existing method is still used.

If the ACK/NACK corresponding to the URLLC service and the ACK/NACK corresponding to the eMBB service are transmitted according to a performance requirement of the URLLC service, a waste of resources may be caused. Specifically, more resources are used to transmit the ACK/NACK corresponding to the eMBB service. Alternatively, if the ACK/NACK corresponding to the URLLC service and the ACK/NACK corresponding to the eMBB service are transmitted according to a performance requirement of the eMBB service, reliability may be decreased. Specifically, a demodulation performance of the URLLC service is decreased from 99.999% to 99%.

Figure 1A:
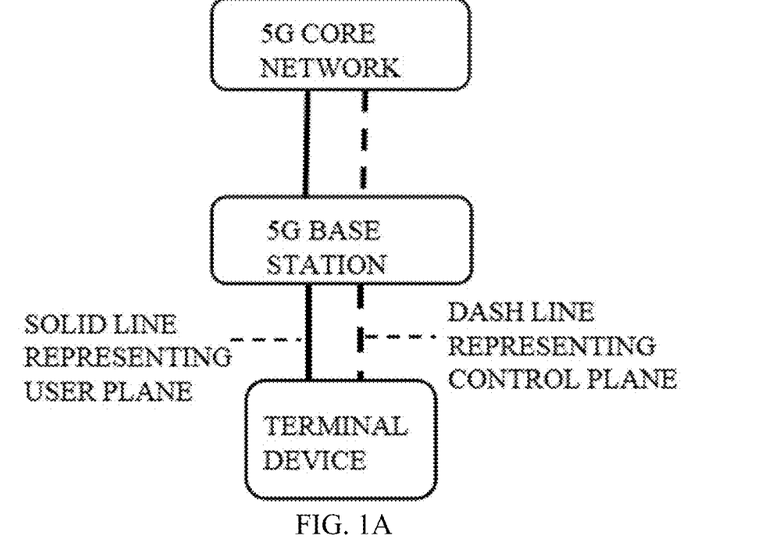
FIG. 1A is a schematic diagram illustrating a communication system based on a 5th generation mobile network (5G) standalone (SA) architecture according to implementations of the disclosure.
Figure 1B:
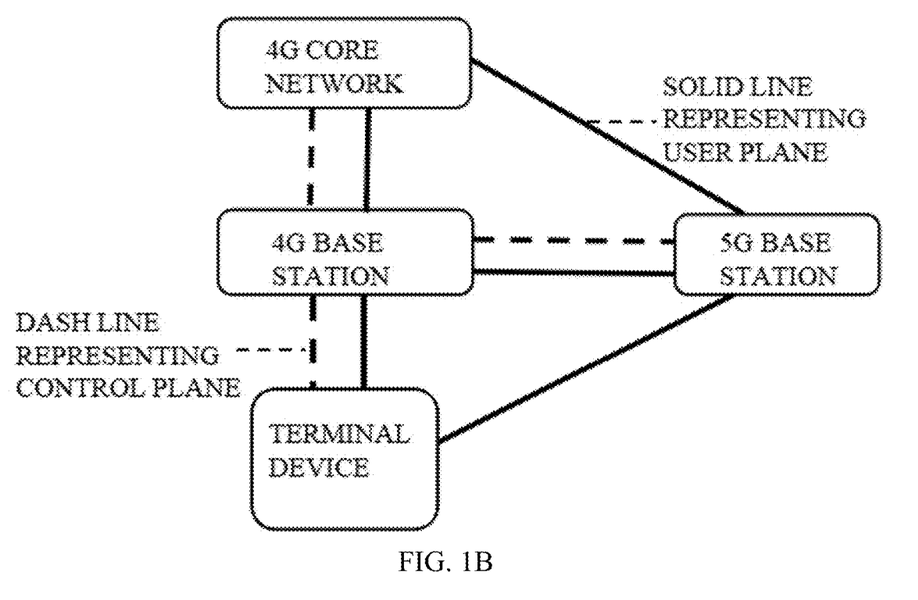
FIG. 1B is a schematic diagram illustrating a communication system based on a 5G non-standalone (NSA) architecture according to implementations of the disclosure.

For the above-mentioned problems, a method for UCI multiplexing transmission is provided in implementations of the disclosure. The method is applied to a 5G NR network architecture. The network architecture may be a non-standalone (NSA) communication network as illustrated in FIG. 1A or a standalone (SA) communication network as illustrated in FIG. 1B, which is not limited herein. In addition, in implementations of the disclosure, the terminal may include various terminals with a wireless communication function, other processing devices connected to wireless modems, various user equipment (UE), mobile stations, terminal devices, and so on. Examples of the various terminals with the wireless communication function include handheld devices, in-vehicle devices, wearable devices (such as smart watches, smart bands, pedometers, and so on), and computing devices. For the sake of convenience, the devices described above are collectively called the terminal. Network devices described in the disclosure include a base station, a core network device, and so on.

In at least one implementation, a method for UCI multiplexing transmission is provided. The method includes transmitting multiple UCI on at least one target physical resource block, where a maximum coding rate corresponding to each of the multiple UCI is separately configured, and the at least one target physical resource block is determined from preset physical resource blocks according to multiple maximum coding rates corresponding to the multiple UCI.

In at least one implementation, the multiple UCI is separately coded.

In at least one implementation, the multiple UCI includes first UCI and second UCI. A number of output bits after rate matching for the second UCI is determined according to a number of output bits after rate matching for the first UCI, where the number of output bits after rate matching for the first UCI is determined according to a number of bits of the first UCI, a number of cyclic redundancy check (CRC) bits corresponding to the first UCI, and a maximum coding rate corresponding to the first UCI.

In at least one implementation, the number of output bits after rate matching for the second UCI equals a difference between a preset number and the number of output bits after rate matching for the first UCI, where the preset number equals a product of a number of the at least one target physical resource block, a number of subcarriers in a resource block, a number of time domain symbols in a physical channel for UCI transmission, and a modulation order for the physical channel.

In at least one implementation, a priority of the first UCI is higher than a priority of the second UCI.

In at least one implementation, a number of the at least one target physical resource block is determined according to a number of bits of each of the multiple UCI, a number of CRC bits corresponding to each of the multiple UCI, and the maximum coding rate corresponding to each of the multiple UCI, where the number of the at least one target physical resource block is smaller than or equal to a number of the preset physical resource blocks.

In at least one implementation, the number of the at least one target physical resource block is a first value, where the first value is a minimum value among multiple values, a product of each of the multiple values, a number of subcarriers in a resource block, a number of time domain symbols in a physical channel for UCI transmission, and a modulation order for the physical channel is larger than or equals a second value, and the second value is determined according to the number of the bits of each of the multiple UCI, the number of the CRC bits corresponding to each of the multiple UCI, and the maximum coding rate corresponding to each of the multiple UCI.

In at least one implementation, the maximum coding rate corresponding to each of the multiple UCI is configured by high-layer signaling.

Figure 2:
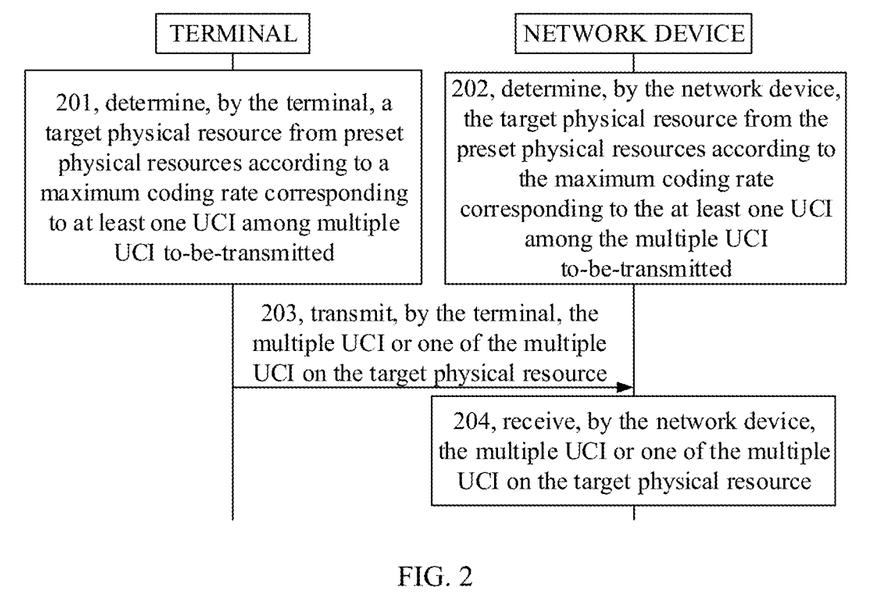
FIG. 2 is a schematic flow chart illustrating a method for uplink control information (UCI) multiplexing transmission according to implementations of the disclosure.

Referring to FIG. 2, FIG. 2 is a schematic flow chart illustrating a method for UCI multiplexing transmission according to implementations of the disclosure. The method is applied to a 5G SA or NSA communication system and includes the following.

At 201, the terminal determines a target physical resource from preset physical resources according to a maximum coding rate corresponding to at least one UCI among multiple UCI to-be-transmitted.

The multiple UCI can be classified according to different coding rates, i.e., different UCI (such as ACK/NACK of the eMBB service, or CSI) corresponding to a same coding rate belongs to same UCI.

A maximum coding rate corresponding to each UCI is semi-statically configured by the base station via high-layer signaling. During actual transmission of UCI, a coding rate actually used may be different from the maximum coding rate under influence of the number of physical resources or the number of bits of feedback information. In general, the coding rate actually used is close to but less than or equal to the maximum coding rate. Under special situations (such as in the Rel-15 when ACK/NACK information is transmitted, even if the number of physical resources is limited, all ACK/NACK information is still transmitted on corresponding physical resources), the coding rate actually used may be greater than the maximum coding rate.

The maximum coding rate corresponding to each UCI is configured via a separate parameter, or multiple maximum coding rates corresponding to the multiple UCI are configured via a same parameter.

At 202, a network device determines the target physical resource from the preset physical resources according to the maximum coding rate corresponding to the at least one UCI among the multiple UCI to-be-transmitted.

At 203, the terminal transmits the multiple UCI or one of the multiple UCI on the target physical resource, where UCI X represents a part of or all the multiple UCI.

At 204, the network device receives the multiple UCI or one of the multiple UCI on the target physical resource.

As can be seen, in implementations of the disclosure, the terminal or the network device determines the target physical resource from the preset physical resources according to the maximum coding rate corresponding to the at least one UCI among the multiple UCI to-be-transmitted, and transmits the multiple UCI or one of the multiple UCI on the target physical resource. It is evident that, since the target physical resource is dynamically determined according to the UCI to-be-transmitted, the maximum coding rate corresponding to the UCI, and the preset physical resources, suitable transmission resources can be determined according to a performance requirement of each service, so as to improve utilization efficiency of transmission resources as much as possible on the premise that requirements of services of different types can be reliably ensured.

In a possible implementation, the terminal or the network device determines the target physical resource from the preset physical resources according to the maximum coding rate corresponding to the at least one UCI among the multiple UCI to-be-transmitted as follows. If a first bit number is less than or equal to a second bit number, the terminal or the network device determines that the number of physical resource blocks in the target physical resource is equal to a first physical-resource-block number. The first bit number is a total number of bits of the multiple UCI. The second bit number is the number of bits of UCI that can be carried on the preset physical resources under constraint of a first maximum coding rate. The first physical-resource-block number is a minimum physical-resource-block number determined according to the first maximum coding rate and the first bit number. The first maximum coding rate is a maximum coding rate among multiple maximum coding rates.

A calculation expression of the second bit number may be, for example, $N_{RB} \cdot N_{sc} \cdot N_{symb} \cdot Q_m \cdot r$, where $N_{RB}$ represents the number of physical resource blocks occupied by the preset physical resources, $N_{sc}$ represents the number of subcarriers in one resource block, $N_{symb}$ represents the number of time domain symbols in a physical channel for UCI transmission, $Q_m$ represents a modulation order for the physical channel, and r represents the first maximum coding rate. Specifically, the first bit number may be a maximum number of bits of UCI that can be carried on the preset physical resources under constraint of the first maximum coding rate.

Take the multiple UCI being two UCI as an example. The number of bits of the multiple UCI is $O_1 + O_2 + O_{CRC}$, where $O_1$ represents the number of bits of first UCI in the two UCI, $O_2$ represents the number of bits of second UCI in the two UCI, and $O_{RC}$ represents a total number of cyclic redundancy check (CRC) bits used for joint coding of the two UCI. The first physical-resource-block number is a minimum physical-resource-block number $N_{RB,min}$ satisfying $O_1 + O_2 + O_{CRC} \leq N_{RB,min} \cdot N_{sc} \cdot N_{symb} \cdot Q_m \cdot r$.

In a possible implementation, the first maximum coding rate includes: a coding rate with a minimum value among the multiple maximum coding rates, a coding rate with a maximum value among the multiple maximum coding rates, a maximum coding rate corresponding to UCI with a high priority among the multiple UCI, a maximum coding rate corresponding to target UCI among the multiple UCI, or a maximum coding rate corresponding to target UCI among the multiple UCI indicated by a base station.

In a possible implementation, the terminal transmits the multiple UCI or one of the multiple UCI on the target physical resource as follows. The terminal performs the joint coding on the multiple UCI and transmits the multiple UCI subjected to the joint coding on the target physical resource.

In this possible implementation, the network device receives the UCI X on the target physical resource as follows. The network device receives the multiple UCI subjected to the joint coding on the target physical resource.

As can be seen, in this implementation, as for a condition that the preset physical resources can be used to transmit the multiple UCI, it can be set that use minimum physical resources to transmit the multiple UCI subjected to the joint coding, so as to improve utilization efficiency of transmission resources as much as possible on the premise that requirements of services of different types can be reliably ensured.

In a possible implementation, the terminal or the network device determines the target physical resource from the preset physical resources according to the maximum coding rate corresponding to the at least one UCI among the multiple UCI to-be-transmitted as follows. If a first physical-resource number is less than or equal to the number of the preset physical resources, the terminal or the network device determines that the number of the physical resource blocks in the target physical resource is equal to the first physical-resource-block number. The first physical-resource number is a physical-resource number determined according to the number of bits of each UCI among the multiple UCI and a maximum coding rate corresponding to each UCI among the multiple UCI. The first physical-resource-block number is a minimum physical-resource-block number determined according to the first physical-resource number.

Take the multiple UCI including two UCI as an example. The first physical-resource number is $$\left\lceil \frac{O_1 + O_{CRC,1}}{r_1} \right\rceil + \left\lceil \frac{O_2 + O_{CRC,2}}{r_2} \right\rceil,$$

where $O_{CRC,1}$ represents the number of CRC bits corresponding to the first UCI, $O_{CRC,2}$ represents the number of CRC bits corresponding to the second UCI, $r_1$ represents the number of bits of the first UCI, and $r_2$ represents the number of bits of the second UCI. The number of the preset physical resources is $N_{RB} \cdot N_{sc} \cdot N_{symb} \cdot Q_m$, and the first physical-resource-block number is a minimum physical-resource-block number $N_{RB,min}$ satisfying $$\left\lceil \frac{O_1 + O_{CRC,1}}{r_1} \right\rceil + \left\lceil \frac{O_2 + O_{CRC,2}}{r_2} \right\rceil \leq N_{RB,min} \cdot N_{sc} \cdot N_{symb} \cdot Q_m.$$

In a possible implementation, the method further includes the following. After determining the target physical resource from the preset physical resources according to the maximum coding rate corresponding to the at least one UCI among the multiple UCI to-be-transmitted, the terminal or the network device determines the number of preset information of each UCI. The number of the preset information of each UCI includes the number of modulation symbols, the number of resource elements (REs), or the number of output bits after rate matching. A total number of preset information of the multiple UCI is equal to the number of preset information in the target physical resource.

Take the multiple UCI including two UCI as an example. In case that the number of the preset information of each UCI includes the number of the modulation symbols or the number of the REs, the number of preset information of the first UCI transmitted is $$Q'_{UCI,1} = \left\lceil \frac{O_1 + O_{CRC,1}}{r_1 \cdot Q_m} \right\rceil,$$

and the number of preset information of the second UCI transmitted is $Q'_{UCI,2} = N_{RB,min} \cdot N_{sc} \cdot N_{symb} - Q'_{UCI,1}$.

In case that the number of the preset information of each UCI includes the number of the output bits after rate matching, the number of the preset information of the first UCI transmitted is $$E_{UCI,1} = \left\lceil \frac{O_1 + O_{CRC,1}}{r_1} \right\rceil,$$

and the number of the preset information of the second UCI transmitted is $E_{UCI,2} = N_{RB,min} \cdot N_{sc} \cdot N_{symb} \cdot Q_m - E_{UCI,1}$.

In a possible implementation, the terminal transmits the multiple UCI or one of the multiple UCI on the target physical resource as follows. The terminal performs separate coding on the multiple UCI to obtain a preset number of modulation symbols or a preset number of output bits after rate matching. The terminal transmits the preset number of the modulation symbols or the preset number of the output bits after rate matching on physical resources of the first physical-resource-block number.

In this possible implementation, the network device receives the UCI X on the target physical resource as follows. The network device receives the preset number of the modulation symbols or the preset number of the output bits after rate matching on the physical resources of the first physical-resource-block number.

As can be seen, in this implementation, as for a condition that the preset physical resources can be used to transmit the multiple UCI, it can be set that use minimum physical resources to transmit the multiple UCI subjected to the joint coding, so as to improve utilization efficiency of transmission resources as much as possible on the premise that requirements of services of different types can be reliably ensured.

In a possible implementation, the terminal or the network device determines the target physical resource from the preset physical resources according to the maximum coding rate corresponding to the at least one UCI among the multiple UCI to-be-transmitted as follows. If the first physical-resource number is greater than the number of the preset physical resources and the number of bits of UCI Y is less than or equal to the first bit number, the terminal or the network device determines that the number of the physical resource blocks in the target physical resource is equal to the first physical-resource-block number. The first physical-resource number is a physical-resource number determined according to the number of bits of each UCI among the multiple UCI and a maximum coding rate corresponding to each UCI among the multiple UCI. The first bit number is the number of the bits of the UCI that can be carried on the preset physical resources under constraint of a maximum coding rate corresponding to the UCI Y. The first physical-resource-block number is a minimum physical-resource-block number determined according to the maximum coding rate corresponding to the UCI Y and the number of the bits of the UCI Y. The UCI Y is UCI with a highest priority among the multiple UCI.

Take the multiple UCI including two UCI and the UCI Y with a highest priority being first UCI as an example. The first physical-resource number is $$\left\lceil \frac{O_1 + O_{CRC,1}}{r_1} \right\rceil + \left\lceil \frac{O_2 + O_{CRC,2}}{r_2} \right\rceil,$$

the first bit number is $N_{RB} \cdot N_{sc} \cdot N_{symb} \cdot Q_m \cdot r_1$, the number of the bits of the UCI Y is $O_1 + O_{CRC,1}$, and the first physical-resource-block number is a minimum physical-resource-block number $N_{RB,min1}$ satisfying $O_1 + O_{CRC,1} \leq N_{RB,min1} \cdot N_{sc} \cdot N_{symb} \cdot Q_m \cdot r_1$.

In a possible implementation, the terminal transmits the multiple UCI or one of the multiple UCI on the target physical resource as follows. The terminal transmits only the UCI Y with the highest priority among the multiple UCI on the target physical resource.

In this possible implementation, the network device receives the UCI X on the target physical resource as follows. The network device receives the UCI Y with the highest priority among the multiple UCI on the target physical resource.

Take the multiple UCI including two UCI as an example. The first UCI is transmitted on $N_{RB,min1}$ REs, and the second UCI is not transmitted by the terminal, so as to ensure reliability of the UCI Y with a high priority and relatively simplify implementation of the terminal.

As can be seen, in this implementation, as for a condition that the preset physical resources cannot satisfy a requirement of transmitting the multiple UCI but can satisfy a requirement of transmitting UCI with a high priority, it can be set that current physical resources are used to transmit the UCI with a high priority, so as to improve utilization efficiency of transmission resources as much as possible on the premise that requirements of a service with a high priority can be reliably ensured.

In a possible implementation, the terminal or the network device determines the target physical resource from the preset physical resources according to the maximum coding rate corresponding to the at least one UCI among the multiple UCI to-be-transmitted as follows. If the first physical-resource number is greater than the number of the preset physical resources and the number of bits of the UCI Y is less than or equal to the first bit number, the terminal or the network device determines that the number of the physical resource blocks in the target physical resource is equal to that of the physical resource blocks occupied by the preset physical resources. The first physical-resource number is a physical-resource number determined according to the number of bits of each of the multiple UCI and multiple maximum coding rates. The first bit number is the number of the bits of the UCI that can be carried on the preset physical resources under constraint of the maximum coding rate corresponding to the UCI Y. The UCI Y is the UCI with the highest priority among the multiple UCI.

Take the multiple UCI including two UCI and the UCI Y with the highest priority being the first UCI as an example. The first physical-resource number is $$\left\lceil \frac{O_1 + O_{CRC,1}}{r_1} \right\rceil + \left\lceil \frac{O_2 + O_{CRC,2}}{r_2} \right\rceil,$$

the first bit number is $N_{RB} \cdot N_{sc} \cdot N_{symb} \cdot Q_m \cdot r_1$, r1 is the maximum coding rate corresponding to the UCI Y, and the number of the bits of the UCI Y is $O_1 + O_{CRC,1}$.

In a possible implementation, the method further includes the following. After determining the target physical resource from the preset physical resources according to the maximum coding rate corresponding to the at least one UCI among the multiple UCI to-be-transmitted and prior to transmitting the multiple UCI or one of the multiple UCI on the target physical resource, the terminal or the network device determines the number of the preset information of each UCI. The number of the preset information of each UCI includes the number of the modulation symbols, the number of the REs, or the number of the output bits after rate matching. The total number of the preset information corresponding to the multiple UCI is equal to the number of the preset information in the target physical resource.

Take the multiple UCI including two UCI as an example. In case that the number of the preset information of each UCI includes the number of the modulation symbols or the number of the REs, the number of the preset information of the first UCI transmitted is $$Q'_{UCI,1} = \left\lceil \frac{O_1 + O_{CRC,1}}{r_1 \cdot Q_m} \right\rceil,$$

and the number of the preset information of the second UCI transmitted is $Q'_{UCI,2} = N_{RB,min} \cdot N_{sc} \cdot N_{symb} - Q'_{UCI,1}$.

In case that the number of the preset information of each UCI includes the number of the output bits after rate matching, the number of the preset information of the first UCI transmitted is $$E_{UCI,1} = \left\lceil \frac{O_1 + O_{CRC,1}}{r_1} \right\rceil,$$

and the number of the preset information of the second UCI transmitted is $E_{UCI,2} = N_{RB,min} \cdot N_{sc} \cdot N_{symb} \cdot Q_m - E_{UCI,1}$.

In a possible implementation, the terminal transmits the multiple UCI or one of the multiple UCI on the target physical resource as follows. The terminal performs the separate coding on the multiple UCI, to obtain the preset number of the modulation symbols or the preset number of the output bits after rate matching. The terminal transmits the preset number of the modulation symbols or the preset number of the output bits after rate matching on the physical resources of the first physical-resource-block number.

In this possible implementation, the network device receives the UCI X on the target physical resources as follows. The network device transmits the preset number of the modulation symbols or the preset number of the output bits after rate matching on the physical resources of the first physical-resource-block number.

Take the multiple UCI including two UCI as an example. Perform separate coding on the first UCI (i.e., UCI Y) and the second UCI. The first UCI is transmitted on $Q'_{UCI,1}$ REs among $N_{RB}$ physical resource blocks. The second UCI is transmitted on $Q'_{UCI,2}$ REs among the $N_{RB}$ physical resource blocks. Alternatively, $E_{UCI,1}$ bits and $E_{UCI,2}$ bits are modulated and then transmitted on the $N_{RB}$ physical resource blocks.

As can be seen, in this implementation, as for a condition that the preset physical resources cannot satisfy the requirement of transmitting the multiple UCI but can satisfy the requirement of transmitting UCI with a high priority, it can be set that the current physical resources are used to satisfy the requirement of transmitting the UCI with a high priority, and it can be set that remaining physical resources are used to satisfy a requirement of transmitting other UCI as much as possible, so as to improve utilization efficiency of transmission resources as much as possible on the premise that requirements of a service with a high priority can be reliably ensured.

In a possible implementation, the method further includes the following. After determining the number of the preset information of each UCI and prior to transmitting the multiple UCI or one of the multiple UCI on the target physical resource, the terminal compresses or truncates other UCI to obtain an actual number of bits of processed UCI. The number of preset information of the other UCI satisfies the following conditions: the number of the bits of the processed UCI is less than or equal to the second bit number, the other UCI is UCI among the multiple UCI except the UCI Y, and the second bit number is a bit number determined according to the number of the preset information of the processed UCI.

Take the multiple UCI including two UCI as an example. The second bit number is $Q'_{UCI,2} \cdot r_2 \cdot Q_m$ or $E_{UCI,2} \cdot r_2$, and $r_2$ is a maximum coding rate corresponding to the second UCI.

In a possible implementation, the terminal transmits the multiple UCI or one of the multiple UCI on the target physical resource as follows. The terminal performs separate coding on the UCI Y and the processed UCI, to obtain a preset number of modulation symbols or a preset number of output bits after rate matching. The terminal transmits the preset number of the modulation symbols or the preset number of the output bits after rate matching on the physical resources of the first physical-resource-block number.

In this possible implementation, the network device receives the UCI X on the target physical resource as follows. The network device receives the preset number of the modulation symbols or the preset number of the output bits after rate matching on the physical resources of the first physical-resource-block number.

Take the multiple UCI including two UCI as an example. The second UCI is compressed or truncated according to $Q'_{UCI,2}$ or $E_{UCI,2}$, to obtain $O'_2$ bits, where $O'_2$ satisfies $O'_2 \leq Q'_{UCI,2} \cdot r_2 \cdot Q_m$ or $O'_2 \leq E_{UCI,2} \cdot r_2$. Perform separate coding on the first UCI and the compressed or truncated second UCI. The first UCI is transmitted on the $Q'_{UCI,1}$ REs among $N_{RB}$ physical resource blocks. The compressed or truncated second UCI is transmitted on the $Q'_{UCI,2}$ REs among $N_{RB}$ physical resource blocks. Alternatively, perform rate matching on the first UCI to obtain $E_{UCI,1}$ bits, perform rate matching on the compressed or truncated second UCI to obtain $E_{UCI,2}$ bits, and the $E_{UCI,1}$ bits and the $E_{UCI,2}$ bits are modulated and then transmitted on $N_{RB}$ physical resource blocks.

As can be seen, in this implementation, as for the condition that the preset physical resources cannot satisfy the requirement of transmitting the multiple UCI but can satisfy the requirement of transmitting the UCI with a high priority, it can be set that the current physical resources are used to ensure the requirement of transmitting the UCI with a high priority, and also compress or truncate the other UCI, and it can be further set that the remaining physical resources are used to satisfy the requirement of transmitting the other UCI, so as to improve utilization efficiency of transmission resources as much as possible on the premise that requirements of a service with a high priority can be reliably ensured.

In a possible implementation, the terminal or the network device determines the target physical resource from the preset physical resources according to the maximum coding rate corresponding to the at least one UCI among the multiple UCI to-be-transmitted as follows. If the first physical-resource number is greater than the number of the preset physical resources, the number of the bits of the UCI Y is less than or equal to the first bit number, and the number of the preset information of the other UCI is less than a first threshold, the terminal or the network device determines that the number of the physical resource blocks in the target physical resource is equal to the first physical-resource-block number. The first physical-resource-block number is a minimum physical-resource-block number determined according to the maximum coding rate corresponding to the UCI Y and the number of the bits of the UCI Y. The first bit number is the number of the bits of the UCI that can be carried on the preset physical resources under constraint of the maximum coding rate corresponding to the UCI Y. The number of the preset information of the other UCI includes the number of modulation symbols, the number of REs, or the number of output bits after rate matching. The total number of the preset information of the multiple UCI is equal to the number of the preset information in the target physical resource. The UCI Y is the UCI with a highest priority among the multiple UCI. The other UCI is UCI among the multiple UCI except the UCI Y.

Take the multiple UCI including two UCI and the UCI Y with a highest priority being the first UCI as an example. The first physical-resource number is $$\left\lceil \frac{O_1 + O_{CRC,1}}{r_1} \right\rceil + \left\lceil \frac{O_2 + O_{CRC,2}}{r_2} \right\rceil.$$

The number of the preset physical resources is $N_{RB} \cdot N_{sc} \cdot N_{symb} \cdot Q_m$. The first bit number is $N_{RB} \cdot N_{sc} \cdot N_{symb} \cdot Q_m \cdot r_1$. The number of the bits of the UCI Y is $O_1 + O_{CRC,1}$. The number of the preset information of the other UCI is $E_{UCI,2} = N_{RB,min} \cdot N_{sc} \cdot N_{symb} \cdot Q_m - E_{UCI,1}$, where $$E_{UCI,1} = \left\lceil \frac{O_1 + O_{CRC,1}}{r_1} \right\rceil,$$

or the number of the preset information of the other UCI is $Q'_{UCI,2} = N_{RB,min} \cdot N_{sc} \cdot N_{symb} - Q'_{UCI,1}$, where $$Q'_{UCI,1} = \left\lceil \frac{O_1 + O_{CRC,1}}{r_1 \cdot Q_m} \right\rceil.$$

The first physical-resource-block number is a minimum physical-resource-block number $N_{RB,min1}$ satisfying $O_1 + O_{CRC,1} \leq N_{RB,min1} \cdot N_{sc} \cdot N_{symb} \cdot Q_m \cdot r_1$.

In this possible implementation, the first threshold is determined according to the number of bits of the other UCI.

The first threshold is a product of the number of the bits of the other UCI and a preset coefficient. The preset coefficient is a constant, and/or the preset coefficient is configured by the base station. Specifically, the first threshold may be $(O_2 + O_{CRC,2}) \cdot A$ or $(O_2 + O_{CRC,2}) \cdot A / Q_m$, where A is the preset coefficient.

It can be known from a corresponding condition $(O_2 + O_{CRC,2}) \cdot A$ or $(O_2 + O_{CRC,2}) \cdot A / Q_m$, if bytecodes can be ensured, the other UCI is transmitted, and if coded bit information cannot be carried, the other UCI is not transmitted.

In this possible implementation, the terminal transmits the multiple UCI or one of the multiple UCI on the target physical resource as follows. The terminal transmits only the UCI Y with the highest priority among the multiple UCI on the target physical resource.

In this possible implementation, the network device receives the UCI X on the target physical resource as follows. The network device receives the UCI Y with the highest priority among the multiple UCI on the target physical resource.

Take the multiple UCI including two UCI as an example. The first UCI is transmitted on $N_{RB,min1}$ physical resource blocks, and the second UCI is not transmitted.

As can be seen, in this implementation, as for the condition that the preset physical resources cannot satisfy the requirement of transmitting the multiple UCI but can satisfy the requirement of transmitting UCI with a high priority, it can be set that the current physical resources are used to transmit the UCI with the high priority, so as to improve utilization efficiency of transmission resources as much as possible on the premise that requirements of a service with a high priority can be reliably ensured.

In a possible implementation, the terminal or the network device determines the target physical resource from the preset physical resources according to the maximum coding rate corresponding to the at least one UCI among the multiple UCI to-be-transmitted as follows. If the number of the bits of the UCI Y is greater than the first bit number, the terminal or the network device determines that the number of the physical resource blocks in the target physical resource is equal to that of the physical resource blocks occupied by the preset physical resources. The first bit number is the number of the bits of the UCI that can be carried on the preset physical resources under constraint of the maximum coding rate corresponding to the UCI Y. The UCI Y is the UCI with the highest priority among the multiple UCI.

In an implementation, the terminal or the network device determines the UCI Y with the highest priority among the multiple UCI, and then perform bit-number comparison.

The first bit number is $N_{RB} \cdot N_{sc} \cdot N_{symb} \cdot Q_m \cdot r_1$, r1 is the maximum coding rate corresponding to the UCI Y, and the number of the bits of the UCI Y is $O_1 + O_{CRC,1}$.

In this possible implementation, the terminal transmits the multiple UCI or one of the multiple UCI on the target physical resource as follows. The terminal transmits only the UCI Y with the highest priority among the multiple UCI on the target physical resource.

In this possible implementation, the network device receives the UCI X on the target physical resource as follows. The network device receives the UCI Y with the highest priority among the multiple UCI on the target physical resource.

First UCI is transmitted on the $N_{RB}$ physical resource blocks, and the first UCI may be the UCI Y.

As can be seen, in this implementation, as for the condition that the preset physical resources cannot satisfy the requirement of transmitting the multiple UCI, it can be set that the current physical resources are used to transmit the UCI with a high priority, so as to ensure that requirements of a service with a high priority can be reliably ensured.

It can be understood that, the multiplexing transmission mechanism under various conditions presented in the above method implementations can be combined freely to form a specification in the communication standard, which is not limited herein.

Figure 3:
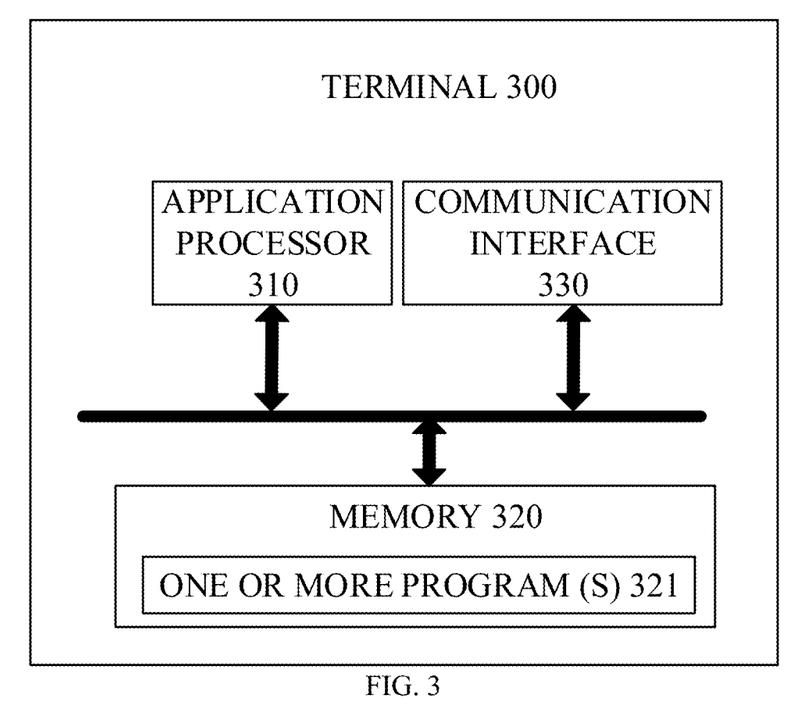
FIG. 3 is a schematic structural diagram illustrating a terminal according to implementations of the disclosure.

In consistence with the implementation in FIG. 2, referring to FIG. 3, FIG. 3 is a schematic structural diagram illustrating a terminal 300 provided in implementations of the disclosure. As illustrated in FIG. 3, the terminal 300 includes a processor 310, a memory 320, a communication interface 330, and one or more program(s) 321. The one or more program(s) 321 is stored in the memory 320 and is configured to be performed by the processor 310, where the one or more program(s) 321 includes instructions for performing any of operations performed by the terminal in the above-mentioned method implementations.

Figure 4:
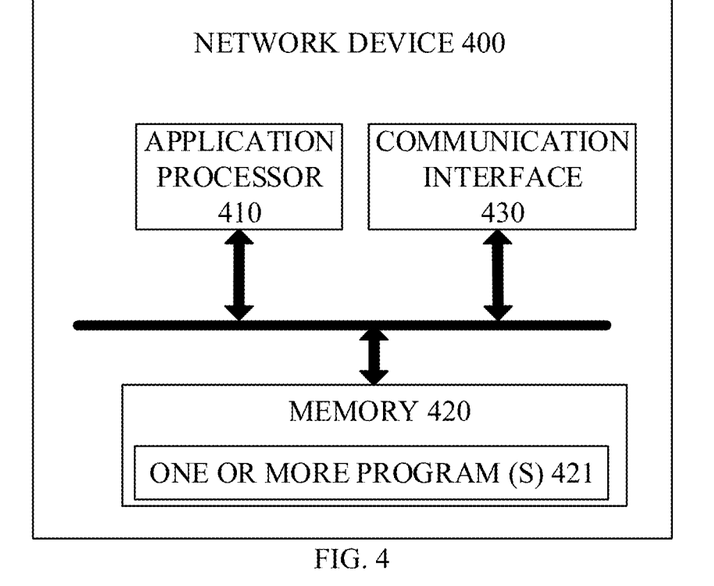
FIG. 4 is a schematic structural diagram illustrating a network device according to implementations of the disclosure.

Referring to FIG. 4, FIG. 4 is a schematic structural diagram illustrating a network device 400 provided in implementations of the disclosure. As illustrated in FIG. 4, the network device 400 includes a processor 410, a memory 420, a communication interface 430, and one or more program(s) 421. The one or more program(s) 421 is stored in the memory 420 and is configured to be performed by the processor 410, where the one or more program(s) 421 includes instructions for performing any of operations performed by the network device in the above-mentioned method implementations.

The foregoing solutions of the implementations of the disclosure is mainly described from the viewpoint of interaction process of various network elements. It can be understood that, in order to implement the above functions, the terminal includes hardware structures and/or software modules corresponding to the respective functions. Those skilled in the art can readily recognize that, in combination with the example units and scheme steps described in the implementations disclosed herein, the present disclosure can be implemented in hardware or a combination of the hardware and computer software. Whether a function is implemented by way of the hardware or hardware driven by the computer software depends on the particular disclosure and design constraints of the technical solution. Those skilled in the art may use different methods to implement the described functions for each particular disclosure, but such implementation may not be considered as beyond the scope of the present disclosure.

According to the implementations of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software functional units. It can be noted that the division of units in the implementations of the present disclosure is schematic, and is merely a logical function division, and there may be other division manners in actual implementation.

Figure 5:
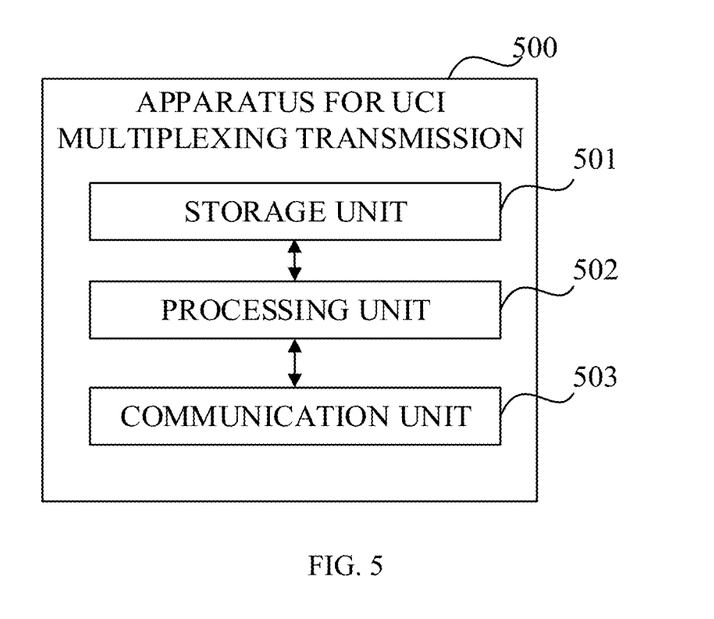
FIG. 5 is a schematic block diagram illustrating function units of an apparatus for UCI multiplexing transmission according to implementations of the disclosure.

In the case of the integrated unit, FIG. 5 is a block diagram illustrating functional units of an apparatus for UCI multiplexing transmission involved in the above implementations. The apparatus 500 for UCI multiplexing transmission is applied to a terminal and includes a processing unit 502 and a communication unit 503. The processing unit 502 is configured to control and manage actions of the terminal, for example, the processing unit 502 is configured to support the terminal to perform operations at 201 and 203 in FIG. 2 and/or other processes of the technology described in the disclosure. The communication unit 503 is configured to support communication between the terminal and other devices. The terminal further includes a storage unit 501 configured to store program codes and data of the terminal.

The processing unit 502 may be a processor or a controller, for example, a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor described above may also be a combination of computing functions, for example, a combination of one or more microprocessors, a combination of the DSP and the microprocessor, and the like. The communication unit 503 may be a communication interface, a transceiver, a transceiver circuit, and the like. The storage unit 501 may be a memory. If the processing unit 502 is the processor, the communication unit 503 is the communication interface, and the storage unit 501 is the memory, the terminal involved in the disclosure may be the terminal illustrated in FIG. 3.

In an implementation, the processing unit 502 is configured to perform any of operations performed by the terminal in the above-mentioned method implementations, and when performing data transmission such as transmitting, it is possible to invoke the communication unit 503 to complete corresponding operations.

Figure 6:
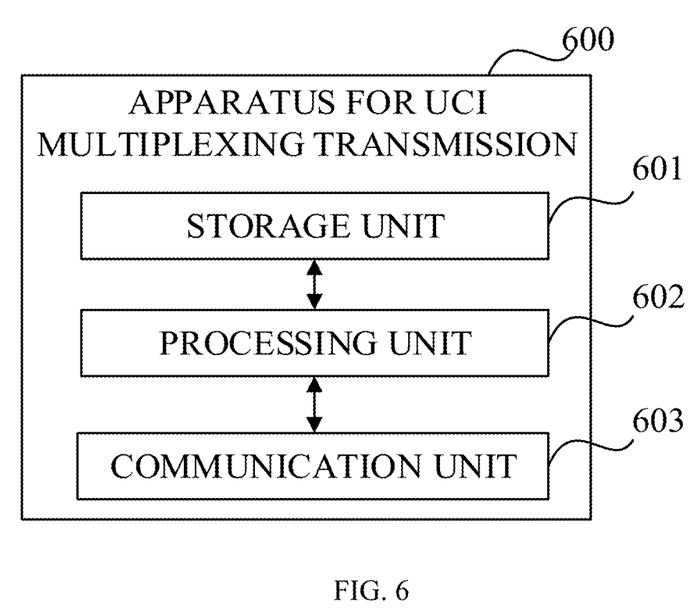
FIG. 6 is a schematic block diagram illustrating function units of an apparatus for UCI multiplexing transmission according to implementations of the disclosure.

In the case of the integrated unit, FIG. 6 is a block diagram illustrating functional units of an apparatus for UCI multiplexing transmission involved in the above implementations. The apparatus 600 for UCI multiplexing transmission is applied to a network device and includes a processing unit 602 and a communication unit 603. The processing unit 602 is configured to control and manage actions of the network device, for example, the processing unit 602 is configured to support the network device to perform operations at 202 and 204 in FIG. 2 and/or other processes of the technology described in the disclosure. The communication unit 603 is configured to support communication between the network device and other devices. The network device further includes a storage unit 601 configured to store program codes and data of the network device.

The processing unit 602 may be a processor or a controller, for example, a CPU, a general-purpose processor, a DSP, an ASIC, an FPGA, or other programmable logic devices, transistor logic devices, hardware components, or any combination thereof. Various exemplary logical blocks, modules, and circuits described in conjunction with the disclosure may be achieved or implemented. The processor described above may also be a combination of computing functions, for example, a combination of one or more microprocessors, a combination of the DSP and the microprocessor, and the like. The communication unit 603 may be a communication interface, a transceiver, a transceiver circuit, and the like. The storage unit 601 may be a memory. If the processing unit 602 is the processor, the communication unit 603 is the communication interface, and the storage unit 601 is the memory, the network device involved in the disclosure may be the network device illustrated in FIG. 4.

In an implementation, the processing unit 602 is configured to perform any of operations performed by the network device in the above-mentioned method implementations, and when performing data transmission such as receiving, it is possible to invoke the communication unit 603 to complete corresponding operations.

A chip is further provided according to the implementations of the disclosure. The chip includes a processor configured to invoke and execute computer programs stored in a memory, to cause a device equipped with the chip to perform a part of or all operations performed by the terminal in the above-mentioned method implementations.

A computer-readable storage medium is provided according to the implementations of the disclosure. The computer-readable storage medium is configured to store computer programs for performing electronic data interchange, where the computer programs causes a computer to perform a part of or all operations performed by the terminal in the above-mentioned method implementations.

A computer-readable storage medium is provided according to the implementations of the disclosure. The computer-readable storage medium is configured to store computer programs for performing electronic data interchange, where the computer programs causes a computer to perform a part of or all operations performed by the network device in the above-mentioned method implementations.

A computer program product is provided according to the implementations of the disclosure. The computer program product includes a non-transitory computer-readable storage medium storing computer programs, where the computer programs are operable with a computer to perform a part of or all operations performed by the terminal in the above-mentioned method implementations. The computer program product may be a software installation package.

The algorithmic operations or the method described in implementations of the disclosure may be implemented as a hardware, or may be implemented by a processing executing software instructions. The software instructions may be consisted of corresponding software modules. The software modules can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in storage media of any other types known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the described functions in implementations of the disclosure can be implemented through software, hardware, firmware, or any other combination thereof. When implemented by software, all or part of the above functions can be implemented in the form of a computer program product. The computer program product includes one or more computer instructions. When the computer instructions are loaded and executed on a computer, all or part of the operations or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of the disclosure. It can be understood that, the above is only an implementation of the disclosure and is not intended to limit the scope of protection of the disclosure. Any modification, equivalent arrangements and improvement made based on the technical solutions of the implementations of the disclosure shall be included in the scope of protection of the disclosure.

What is claimed is:

1. A method for uplink control information (UCI) multiplexing transmission, comprising:
   transmitting multiple UCI on at least one target physical resource block, wherein a maximum coding rate corresponding to each of the multiple UCI is separately configured, and the at least one target physical resource block is determined from preset physical resource blocks according to multiple maximum coding rates corresponding to the multiple UCI;
   wherein the multiple UCI comprises first UCI and second UCI, wherein a priority of the first UCI is higher than a priority of the second UCI;
   wherein a number of output bits after rate matching for the second UCI is determined according to a number of output bits after rate matching for the first UCI, wherein the number of output bits after rate matching for the first UCI is determined according to a number of bits of the first UCI, a number of cyclic redundancy check (CRC) bits corresponding to the first UCI, and a maximum coding rate corresponding to the first UCI.

2. The method of claim 1, wherein the multiple UCI is separately coded.

3. The method of claim 1, wherein:
the number of output bits after rate matching for the second UCI equals a difference between a preset number and the number of output bits after rate matching for the first UCI, wherein the preset number equals a product of a number of the at least one target physical resource block, a number of subcarriers in a resource block, a number of time domain symbols in a physical channel for UCI transmission, and a modulation order for the physical channel.

4. The method of claim 1, wherein:
a number of the at least one target physical resource block is determined according to a number of bits of each of the multiple UCI, a number of CRC bits corresponding to each of the multiple UCI, and the maximum coding rate corresponding to each of the multiple UCI, wherein the number of the at least one target physical resource block is smaller than or equal to a number of the preset physical resource blocks.

5. The method of claim 4, wherein:
the number of the at least one target physical resource block is a first value, wherein the first value is a minimum value among multiple values, wherein a product of each of the multiple values, a number of subcarriers in a resource block, a number of time domain symbols in a physical channel for UCI transmission, and a modulation order for the physical channel is larger than or equals a second value, wherein the second value is determined according to the number of the bits of each of the multiple UCI, the number of the CRC bits corresponding to each of the multiple UCI, and the maximum coding rate corresponding to each of the multiple UCI.

6. The method of claim 1, wherein the maximum coding rate corresponding to each of the multiple UCI is configured by high-layer signaling.

7. A method for uplink control information (UCI) multiplexing transmission, comprising:
receiving multiple UCI on at least one target physical resource block, wherein a maximum coding rate corresponding to each of the multiple UCI is separately configured, and the at least one target physical resource block is determined from preset physical resource blocks according to multiple maximum coding rates corresponding to the multiple UCI;
wherein the multiple UCI comprises first UCI and second UCI, wherein a priority of the first UCI is higher than a priority of the second UCI;
wherein a number of output bits after rate matching for the second UCI is determined according to a number of output bits after rate matching for the first UCI, wherein the number of output bits after rate matching for the first UCI is determined according to a number of bits of the first UCI, a number of cyclic redundancy check (CRC) bits corresponding to the first UCI, and a maximum coding rate corresponding to the first UCI.

8. The method of claim 7, wherein:
the number of output bits after rate matching for the second UCI equals a difference between a preset number and the number of output bits after rate matching for the first UCI, wherein the preset number equals a product of a number of the at least one target physical resource block, a number of subcarriers in a resource block, a number of time domain symbols in a physical channel for UCI transmission, and a modulation order for the physical channel.

9. The method of claim 7, wherein:
a number of the at least one target physical resource block is determined according to a number of bits of each of the multiple UCI, a number of CRC bits corresponding to each of the multiple UCI, and the maximum coding rate corresponding to each of the multiple UCI, wherein the number of the at least one target physical resource block is smaller than or equal to a number of the preset physical resource blocks.

10. The method of claim 9, wherein:
the number of the at least one target physical resource block is a first value, wherein the first value is a minimum value among multiple values, wherein a product of each of the multiple values, a number of subcarriers in a resource block, a number of time domain symbols in a physical channel for UCI transmission, and a modulation order for the physical channel is larger than or equals a second value, wherein the second value is determined according to the number of the bits of each of the multiple UCI, the number of the CRC bits corresponding to each of the multiple UCI, and the maximum coding rate corresponding to each of the multiple UCI.

11. A terminal, comprising:
a transceiver;
a processor; and
a memory storing a computer program which, when executed by the processor, causes the transceiver to:
transmit multiple UCI on at least one target physical resource block, wherein a maximum coding rate corresponding to each of the multiple UCI is separately configured, and the at least one target physical resource block is determined from preset physical resource blocks according to multiple maximum coding rates corresponding to the multiple UCI;
wherein the multiple UCI comprises first UCI and second UCI, wherein a priority of the first UCI is higher than a priority of the second UCI;
wherein a number of output bits after rate matching for the second UCI is determined according to a number of output bits after rate matching for the first UCI, wherein the number of output bits after rate matching for the first UCI is determined according to a number of bits of the first UCI, a number of cyclic redundancy check (CRC) bits corresponding to the first UCI, and a maximum coding rate corresponding to the first UCI.

12. The terminal of claim 11, wherein:
the number of output bits after rate matching for the second UCI equals a difference between a preset number and the number of output bits after rate matching for the first UCI, wherein the preset number equals a product of a number of the at least one target physical resource block, a number of subcarriers in a resource block, a number of time domain symbols in a physical channel for UCI transmission, and a modulation order for the physical channel.

13. The terminal of claim 11, wherein:
a number of the at least one target physical resource block is determined according to a number of bits of each of the multiple UCI, a number of CRC bits corresponding to each of the multiple UCI, and the maximum coding rate corresponding to each of the multiple UCI, wherein the number of the at least one target physical resource block is smaller than or equal to a number of the preset physical resource blocks.

14. The terminal of claim 13, wherein:

the number of the at least one target physical resource block is a first value, wherein the first value is a minimum value among multiple values, wherein a product of each of the multiple values, a number of subcarriers in a resource block, a number of time domain symbols in a physical channel for UCI transmission, and a modulation order for the physical channel is larger than or equals a second value, wherein the second value is determined according to the number of the bits of each of the multiple UCI, the number of the CRC bits corresponding to each of the multiple UCI, and the maximum coding rate corresponding to each of the multiple UCI.

* * * * *